Dec. 31, 1963  GILBERT VP. TOTTEN  3,115,822
BEVERAGE BREWING APPARATUS
Filed Jan. 11, 1962  2 Sheets—Sheet 1
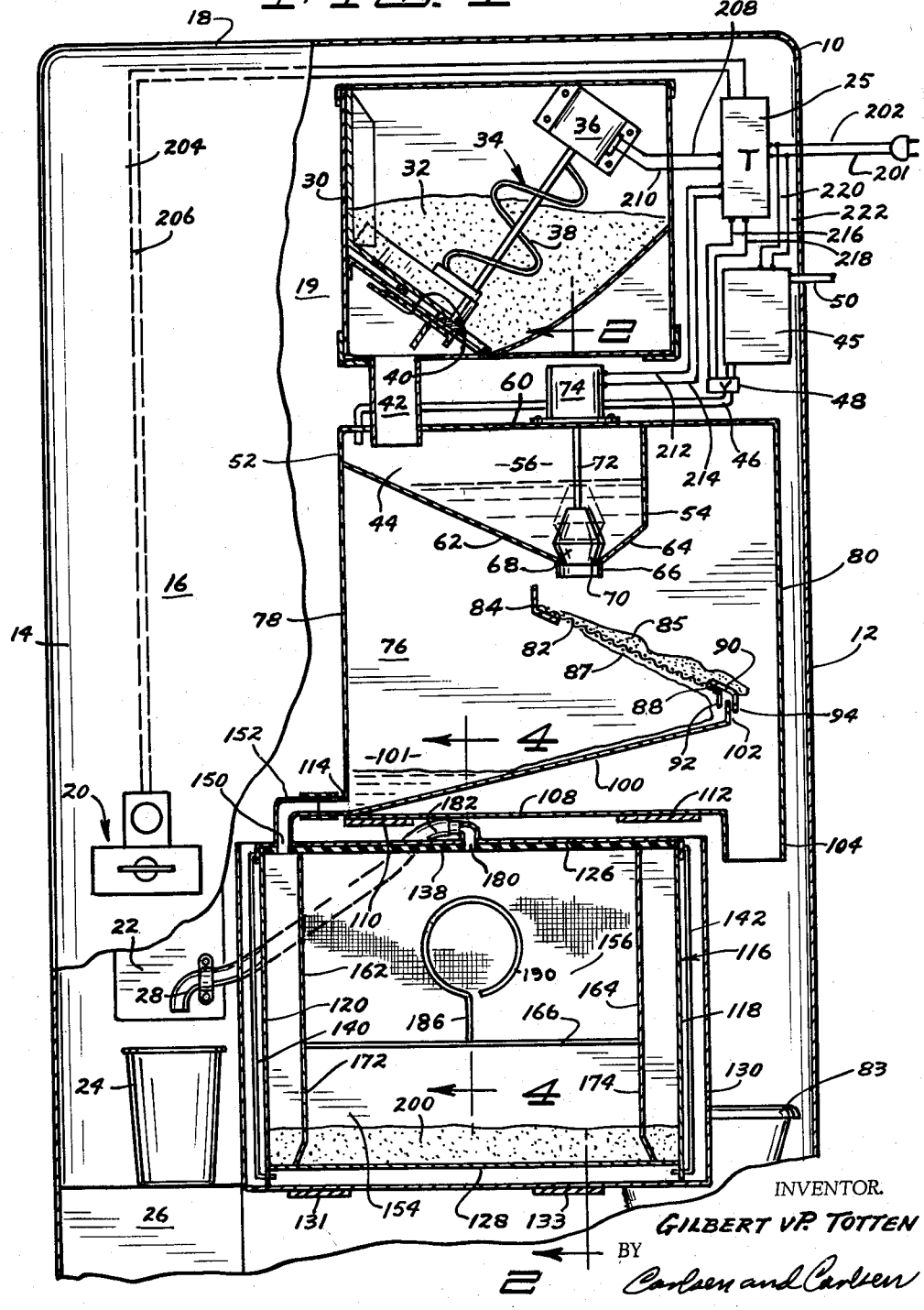
INVENTOR.
GILBERT VP. TOTTEN
BY
Carlsen and Carlsen
ATTORNEYS

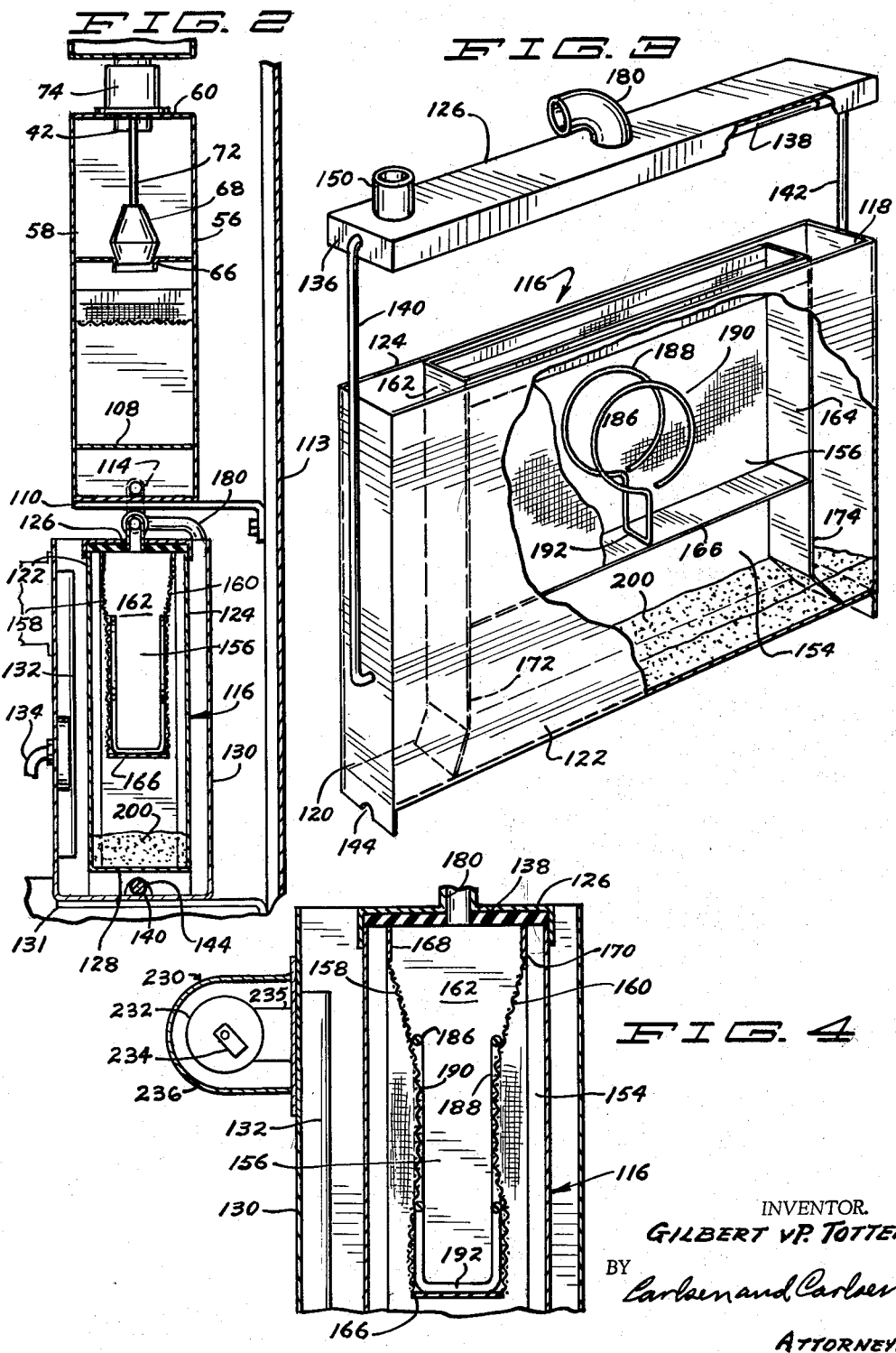

United States Patent Office 3,115,822
Patented Dec. 31, 1963

3,115,822
BEVERAGE BREWING APPARATUS
Gilbert vP. Totten, Minneapolis, Minn., assignor to Advance Engineering Company, Minneapolis, Minn., a corporation of Minnesota
Filed Jan. 11, 1962, Ser. No. 165,478
13 Claims. (Cl. 99—289)

This invention relates to beverage brewing devices and more particularly to devices for intermittent brewing and dispensing of an indefinite number of unit quantities of a beverage. This invention is particularly useful in coin-operated vending machines.

According to the prior practice of brewing beverages such as coffee and tea in vending machines or the like, there have been two general approaches. In the first of these, a single cup is brewed each time a coin is inserted. Brewing is accomplished either by forcing preheated water through a porous envelope containing ground coffee or tea, or by mixing water with the beverage solids in a brewing chamber and thereafter straining the grounds from the beverage thus prepared. Each cup is dispensed immediately after being prepared. It has been found, however, that in this process the flavor and aroma of the beverage is often substandard because it is not practical to allow the ground coffee or tea to remain in the water for a sufficient length of time.

According to another well known process, a relatively large pot of the beverage which may contain, for example, twenty to thirty cups is brewed periodically. The beverage in this pot is then dispensed a cup at a time over an extended period as the machine is operated. This process, however, has several shortcomings. First, the coffee can become stale due to the relatively long period of time during which it must be stored. Furthermore, when a large group of people are to be served, the brewed coffee can be quickly exhausted and a substantial time may elapse before the next pot can be prepared.

Another deficiency of prior beverage preparing devices results from the fact that the strainers used for separating the grounds from the coffee or tea must periodically be removed and cleaned by hand or, in the alternative, a relatively complicated apparatus provided for periodically removing grounds from the strainer.

Still another shortcoming of prior brewing devices results from the fact that while adequate separation of the grounds from the liquid is provided, it is frequently found that the liquid after being thus strained contains very finely divided suspended particulate material. The accumulation of this material in the form of sediment at the bottom of a coffee cup is, of course, undesirable.

In view of the shortcomings in the prior art, it is one object of this invention to provide an improved beverage brewing apparatus wherein the solids of the beverage will remain in intimate contact with the liquid for a sufficient period of time to bring about optimum aroma and flavor but wherein a unit quantity of beverage will be dispensed as soon as the apparatus is operated.

It is another object of this invention to provide an improved beverage apparatus which does not require that the coffee be brewed in a large volume which can become stale.

It is a still further object of this invention to provide an improved beverage brewing apparatus which can be operated intermittently as required to dispense a large number of cups of a beverage and wherein the beverage will not become exhausted until all of the beverage solids stored within the machine have been used.

It is another object of this invention to provide an improved beverage brewing apparatus having a simply constructed strainer which will operate for relatively long periods of time without being cleaned.

It is another object of this invention to provide an improved beverage brewing apparatus with a filter for removing finely divided suspended particulate material from the beverage after the grounds have been separated therefrom and wherein the filter is self-cleaning.

It is still a further object of this invention to provide a beverage brewing apparatus with a filter for separating finely divided particulate material from the beverage and including means for assuring immediate delivery of the beverage into a drinking vessel even though substantial time is required for the beverage to pass through said filter.

These and other more detailed and specific objects will be disclosed in the course of the following specification, reference being had to the accompanying drawings, in which—

FIG. 1 is a partial side elevational view, partly in section, showing a preferred form of my invention.

FIG. 2 is a vertical sectional view taken along line 2—2 in FIG. 1.

FIG. 3 is a perspective view of the sediment filter of FIGS. 1 and 2 broken away.

FIG. 4 is a vertical sectional view taken along line 4—4 in FIG. 1.

With reference now to the drawings, there is shown in FIGS. 1–4 a beverage brewing machine machine 10 including side walls 12 and 14, a front wall 16, a top wall 18, and a back wall 19. The machine includes a conventional coin-receiving and operating switch mechanism of known construction, indicated generally at 20. The machine also has mounted therein a cup storage magazine 22, only a part of which is shown. When the machine is operated by inserting a coin in the coin-receiving slot 20, a suitable dispenser of known construction (not shown) will cause a cup 24 to fall from the magazine 22 to the position of FIG. 1 with its lower end resting upon a suitable support 26. The cup 24 in this position is ready to receive a measured quantity of a beverage from a suitable outlet nozzle 28 positioned above the cup.

At the upper end of the apparatus 10 there is provided a container 30 for storing beverage solids such as ground coffee, tea leaves or the like, designated 32. Within the container 30 there is provided a dispensing mechanism 34 including a motor 36 and an auger 38. While any suitable dispensing mechanism can be used for dispensing a measured amount of coffee or tea from the container 30, the dispenser illustrated in FIG. 1 is the same dispenser more fully described in my prior Patent No. 2,975,937, issued March 21, 1961. The dispenser 34 will deliver a measured amount of material through an opening 40 at the lower end of container 30 each time a coin is inserted.

The material delivered through the opening 40 passes through a vertically disposed conduit 42 connected at its upper end to the bottom of the container 30 and extending at its lower end into a brewing chamber 44. At the same time as the beverage solids are introduced into the chamber 44, a measured volume of water preheated in a heating chamber 45 is introduced into the chamber 44 through a pipe 46 connected between chamber 45 and chamber 44. The flow of water into chamber 44 can be controlled by a suitable electrically actuated valve 48 of known construction which is provided in the pipe 46. The inlet of heating chamber 45 is connected to a water supply (not shown) by means of a pipe 50.

The brewing chamber 44 comprises vertical front and rear walls 56 and 58, respectively, a top wall 60, and inclined bottom walls 62 and 64. The bottom walls 62 and 64 are inclined downwardly to form a trough near the right end of the chamber as viewed in FIG. 1. In this trough there is provided an annular outlet port 66. Within the outlet port 66 is a vertically movable flow control valve 68. The valve 68 is provided with an annular valve face 70 adapted to seal the port 66 when the valve 68 is in the solid line position of FIG. 1. Extending upwardly from the valve 68 is a valve stem 72 connected at its upper end to the actuator of a solenoid 74. When the mixture of beverage and solids are to be dispensed from the brewing chamber 44, operation of the solenoid 74 will raise the valve member 68 to the dotted line position of FIG. 1, allowing the mixture to flow out of the brewing chamber 44 through the outlet port 66.

The front and rear walls 56 and 58 extend downwardly from the chamber 44 and are continuous with the walls of a second chamber 76. The chamber 76 is bounded on the sides by walls 78 and 80. Within the chamber 76 there is provided an inclined strainer 82 which extends laterally between the front and rear walls 56 and 58. The upper end of the strainer 82 is positioned beneath the port 66 so that the beverage brewed within the chamber 44 will fall through the port onto the upper surface thereof.

By positioning the strainer 82 at an inclined angle, the grounds or other solids which have accumulated on its upper surface at 85 will be washed toward its lower end each time the chamber 44 is emptied. A portion of the grounds at 85 will fall off the lower end of the strainer periodically into a storage receptacle 83. The strainer 82 can thus be thought of as self-cleaning.

The strainer 82 can be supported at its upper end by a cross brace 84. At its lower end, the strainer 82 has secured to it a pair of horizontally disposed support members 88 and 90. Each of members 88 and 90 is connected at its upper edge to the strainer 82. The members 88 and 90 are provided with longitudinally spaced apart downwardly directed lip portions, designated at 92 and 94, respectively.

The angle with respect to the horizontal at which the strainer 82 should be placed for proper operation depends upon many factors including the type of beverage being brewed, the character of the grounds, their concentration in the brewing chamber and the type of material from which the strainer is formed. I have found, however, that when the strainer comprises a metal screen formed from wire of about .0023 inch in diameter and with a mesh size of from 120 to 230 openings per square inch, operation was satisfactory with the screen placed at an angle of forty-five degrees to the horizontal.

Positioned below the strainer 82 and connected at each edge thereof between the front and back walls 56 and 58 is an inclined bottom wall 100 which with the side, back and front walls 78, 56 and 58, respectively, comprises a liquid receiver 101. The upper end of the wall 100 includes a portion 102 disposed between the spaced apart lip portions 92 and 94. Positioned below the lower end of the strainer 82 the chamber 76 has provided in it an outlet opening 104 and it is through this opening that the grounds which accumulate on the upper surface of the strainer 82 pass when they fall from the lower end thereof into the storage receptacle 83.

Thus, when the brewing chamber 44 has been filled with a mixture of granular solids and water and the valve 68 is withdrawn from the port 66, the mixture within the chamber 44 will fall onto the inclined strainer 82. The liquid portion of the mixture 87 will pass through the strainer and a large part of this liquid will follow the strainer downwardly to its lower end and then flow onto the bottom wall 100 and accumulate in the receiver 101. A portion of this liquid also appears to travel down the screen on its upper surface and this liquid helps to move the grounds at 85 toward the lower end of the strainer 82.

The chamber 76 can also be provided with a horizontally disposed bottom wall 108 and the entire chamber 76 can be suitably supported from brackets 110 and 112 affixed to a portion of the frame 113 of the apparatus as shown in FIGS. 1 and 2. The fluid accumulating in the receiver 101 is exhausted from the chamber 76 through an outlet port 114 provided in the lower end of the receiver 101.

While the outlet port 114 can, if desired, be connected directly to the outlet nozzle 28, thus allowing the coffee to flow from the chamber 76 into a drinking vessel such as cup 24, it is preferred and particularly when the apparatus is to be used for preparing coffee that the outlet 114 be connected to the inlet of a filter chamber 116. The filter chamber 116 is generally rectangular and includes side walls 118 and 120, a front wall 122, a back wall 124, a removable cover 126 and a bottom wall 128. In a preferred form of my invention the entire filter chamber 116 is recessed within an insulated heating compartment 130. The heating compartment 130 may be formed from a suitable insulating material and has provided on one side wall thereof a heater, such as an electrical resistance heater 132. Current is supplied to the heater 132 through conductors 134, as shown in FIG. 2, and the temperature thereof regulated conventionally by an internal thermal switch (not shown). An air space between the heater 132 and the chamber 116 will prevent a hot spot from developing on the side of chamber 116 adjacent the heater. The heater 132 should maintain the beverage within the filter chamber 116 at a temperature suitable for drinking but not so warm as to adversely affect the flavor and aroma of the beverage therein. I have found that a temperature of from about 160° to 165° F. is suitable for beverages such as coffee. The chamber 130 can be supported upon horizontally disposed brackets 131 and 133 secured to the frame member 113.

The cover 126 includes downwardly extending flanges 136 enabling the cover to fit telescopically over the upper edge of the filter chamber 116. Secured within the cover 126 is a sheet of resilient sealing material 138 such as rubber which ensures a hermetic seal for the filter chamber 116. Extending downwardly from the ends of the cover 126 and pivotally connected thereto are a pair of fastening rods 140 and 142. These rods include portions which extend inwardly at their lower ends and engage corresponding notches 144 on either end of the lower edge of the filter chamber 116 to thereby securely retain the cover 126 in place on the chamber 116.

The chamber 116 has an inlet port 150 at its upper end which communicates with the outlet port 114 through duct 152. The material flowing into the chamber 116 through duct 152 passes into a first or outer chamber 154 and the fluid within this outer chamber passes into a second or inner chamber 156 through vertically disposed filter elements 158 and 160.

The chambers 154 and 156 together are made to contain from about two to five cups of beverage. As a result, a relatively large quantity of prepared beverage is never stored over an extended period of time. Moreover, it should be clearly understood that each time the machine is operated, a fraction of each cup dispensed is made up of the beverage that has just been brewed in chamber 44, thus assuring adequate freshness.

The inner chamber 156 includes an upper wall formed from a portion of the cover 126, vertically disposed end walls 162, and 164, a horizontally disposed bottom wall 166 and the front and rear walls comprise the filter elements 158 and 160. At the upper end of the inner chamber 156 there is provided a pair of horizonatally disposed support members 168 and 170 to which the upper edges of the filter elements 158 and 160 are secured. The end walls 162 and 164 of the chamber 156 include downwardly extending portions 172 and 174, respectively, to support the chamber 156 above the lower wall 128 of the chamber 116 and also to hold the upper edges of the chamber 156 in secure contact with the sealing element 138.

While the filter elements 158 and 160 can be formed from a variety of materials, screening formed from wire about .0017 inch in diameter and having about 325 openings to the square inch has proved to be satisfactory.

An outlet opening 180 which communicates with chamber 156 is provided in the sealing element 138 and the cover 126. Suitably connected to outlet opening 180 is an outlet duct 182. Duct 182 is connected at its opposite end to the nozzle 28.

Disposed within the chamber 156 and extending between the filter elements 158 and 160 there is preferably provided an inwardly yieldable resilient member such as a wire spring 186. The spring 186 can include ring portions 188 and 190 disposed adjacent the inner surfaces of the filter elements 158 and 160 and a central connecting portion 192. The resilient member 186 normally maintains the filter elements 158 and 160 in a flat condition, as shown in FIGS. 2 and 3. When fluid enters the inlet port 150, however, a transient pressure differential across the filter elements 158 and 160 will cause the center of the elements to move inwardly, as shown in FIG. 4, against the spring force of the resilient member 186. Since the volume of the chamber 156 has thus been decreased, liquid within the chamber 156 will flow outwardly through the outlet port 180 and through outlet duct 182 to the nozzle 28 when it is dispensed into the cup 24. It should be noted that the delivery of the beverage from chamber 156 to the nozzle 28 will thus take place immediately even though the filter elements may be obstructed to some extent with particulate material. Moreover, the flexing action of the filter elements helps to clean them.

While the operation of the apparatus 10 can be controlled in various ways, I prefer to employ an electrical control generally similar to that described in my prior patent referred to hereinabove.

With reference now to FIG. 1 there is illustrated a suitable electrical control system comprising an electrical timer 25 to which current is supplied through conductors 201 and 202. The cycle of operation of timer 25 is initiated by the coin-receiving mechanism 20 connected to the timer 25 by means of conductors 204 and 206. The timer 25 is connected to the dispenser drive motor 36 by conductor 208 and 210, to the valve actuator solenoid 74 by means of conductors 212 and 214 and to solenoid operated valve 48 by means of conductors 216 and 218. Current is supplied to the heater 45 through conductors 220 and 222.

As best seen in FIG. 4, a vibrator means 230 is secured to the side of container 130. The vibrator can include a drive motor such as an electric rotary motor 232 with an eccentric weight 234 rigidly secured to the output shaft thereof. The motor 232 is rigidly secured to the wall 122 by means of a mounting block 235 and is preferably enclosed within a housing 236. When electric current is supplied to the motor 232 through suitable conductors (not shown), the vibratory movement imparted to the container 130 will be transmitted to the chamber 116 and screens 158 and 160 thereby helping to loosen and remove particulate material from the outer surfaces of the screens. The vibrator 230 can be operated intermittently but is preferably operated continuously throughout operation of the apparatus.

As clearly shown in FIGS. 2 and 4 the lower edges of screens 158 and 160 are spaced somewhat closer together than the upper edges thereof. This provision will help assure that particulate material which has been deposited on the outward surfaces of the screens will fall freely to the bottom of chamber 116.

In the following description of operation of my invention, it will be assumed that chamber 116 is filled with a beverage.

To operate the apparatus, a coin is inserted in the coin-receiving mechanism 20 completing an electrical circuit through the conductors 204 and 206 to the timer 25 and also causing a cup 24 to fall from dispenser 22. The timer 25 then starts the motor 36 by the passage of current through conductors 208 and 210. The operation of the dispensing mechanism 34 is exactly as described in my prior patent referred to hereinabove and will not be described in further detail herein. The ground coffee or tea leaves 32 then pass from the container 30 through conduit 42 and to the brewing chamber 44. Simultaneously, a valve 48 is actuated by the timer 25 thus causing a measured amount of water to enter the brewing chamber 44 through the pipe 46. As these operations are performed, the valve 68 is in its seated position.

After the beverage and liquid have been allowed to stand in the brewing chamber 44 for a short period of time (and I have found that from about one second to ten seconds is satisfactory), the timer operates the solenoid 74 causing the valve 68 to move upwardly to the dotted line position of FIG. 1. The mixture of water and grounds then falls through the port 66 onto the upper end of the strainer 82. The grounds are deposited on the upper surface at 85 while the liquids run down the strainer on its under surface at 87 and also to some extent on the upper surface of the strainer beneath the grounds 85.

As the mixture passes from the port 66 onto the strainer, it will thus be understood that a portion of the grounds 85 which have accumulated on the upper surface of the strainer 82 will fall from the lower end of the strainer through the opening 104 into the storage receptacle 83.

Virtually all of the liquid portion of the beverage 87 will flow down the inclined bottom wall 100 and be temporarily stored in the receiver 101. The support member 88 will prevent the liquid 87 from flowing beyond the upper end of the lower wall 100 and the member 90 will prevent the grounds 85 from flowing onto the upper surface of the wall 100.

As explained hereinabove filter chamber 116 is already filled and the liquid portion of the beverage within the receiver 101 will flow through duct 152 into the chamber 154. Because of the fineness of the openings of the filter elements 158 and 160 and also because the openings therein may be partially obstructed with finely divided particulate material, these members will be forced inwardly against the spring pressure of the spring 186. As these elements move inwardly fluid within chamber 156 will pass out through the port 180 and duct 182 to the nozzle 28, and it should be noted that the beverage is thus dispensed as soon as fluid enters chamber 154 even though the filter elements 158 and 160 are partially obstructed.

After the cup 24 has been filled with the beverage the spring 186 continues to exert an outward pressure on the filter elements 158 and 160 and thus after a few moments the filter elements will again return to the position of FIGS. 2 and 3. In this position the apparatus is ready to dispense another unit quantity of the beverage.

As can be seen in FIGS. 1, 2 and 3 the sediment accumulating on the filter elements 158 and 160, since they are positioned vertically, will readily fall from their outer surfaces onto the floor of the chamber 116 and accumulate at 200. Periodic flexing of the filter elements 158 and 160 will help to remove the accumulation of particulate material from their outer surfaces.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A beverage brewing apparatus, comprising in combination, a brewing chamber, said chamber having an outlet port therein, means for dispensing a measured quantity of beverage solids into said chamber, means for dispensing a measured quantity of a liquid into said chamber, an inclined strainer stationarily positioned below said outlet port, said strainer being adapted to receive said material on its upper surface, receiving means below said strainer, duct means communicating with said receiving means to convey said liquid to a drinking vessel and a receptacle below the lower end of said strainer to receive beverage solids passing off said lower end of the strainer.

2. A beverage brewing apparatus comprising a beverage solids storage container including side and bottom walls, said container having an outlet therein, a dispenser operatively associated with said storage container for transferring a predetermined quantity of said solids therefrom through said outlet, a brewing chamber positioned to receive material from said outlet, said brewing chamber having an outlet port, means for dispensing a measured quantity of liquid into said brewing chamber, a strainer positioned to receive material passing out of said brewing chamber through said outlet port and separate said solids from said liquid, a receiver below said strainer to intercept the liquids passing through said strainer, a storage receptacle communicating with said receiver, said storage receptacle having an outlet opening near the upper end thereof, a dispensing duct communicating with said outlet opening to convey said beverage to a drinking vessel, and during operation said receptacle being filled with said beverage whereby the addition of liquid through said duct will cause a portion of the beverage within said receptacle to be discharged through said outlet opening.

3. A beverage brewing apparatus comprising a brewing chamber, a beverage solids storage container, a dispenser operatively associated with said storage container to transfer a measured amount of said solids into said brewing chamber, means to transfer a measured amount of water into said brewing chamber, said brewing chamber having an outlet therein, an inclined strainer below said outlet, said strainer being adapted to receive on its upper surface a mixture of water and solids from the the brewing chamber, said strainer having an upper and lower end, a receptacle below the lower end to receive solids falling from the lower end thereof, a receiver below the strainer to intercept liquid passing therethrough, a filter chamber, said filter chamber having a first compartment communicating with said receiver, a second compartment, and a vertically disposed foraminous filter element between said compartments, and a dispensing outlet communicating with said second compartment to transfer the beverage within said second compartment to a drinking vessel.

4. A beverage brewing and dispensing apparatus comprising in combination; a beverage brewing chamber, said chamber having a discharge port at the lower end thereof; a movable valve element in said discharge port; a beverage solids storage container; a solids dispenser operatively associated with said container to discharge a measured amount of said solids from said container into said brewing chamber; a water heater; duct means communicating between said water heater and a water supply; a measuring valve communicating between said heater and said brewing chamber to dispense a measured amount of water from said heater into said chamber; a valve actuator means connected to said movable valve element, said movable valve element being movable between a closed position adapted to seal said discharge port and an open position out of said port; control means operatively connected to said actuator, said solids dispenser and said measuring valve, said control means being adapted to simultaneously operate said measuring valve and said solids dispenser with said movable valve element in said closed positon and thereafter operate said actuator to move said valve element to said open position, an inclined strainer, said strainer being positioned with the upper end thereof below said discharge port, means below said strainer to receive liquids passing therethrough and a receptacle positioned below the lower end of said strainer to receive solids passing off said lower end.

5. A beverage brewing and dispensing apparatus comprising in combination; a beverage brewing chamber, said chamber having a discharge port at the lower end thereof; a movable valve element in said discharge port; a beverage solids storage container; a solids dispenser operatively associated with said container to discharge a measured amount of said solids from said container into said brewing chamber; a water heater; duct means communicating between said water heater and a water supply; a measuring valve communicating between said heater and said brewing chamber to dispense a measured amount of water from said heater into said chamber; a valve actuator means connected to said movable valve element, said movable valve element being normally in a first position adapted to seal said discharge port; control means to simultaneously operate said measuring valve and said solids dispenser with said movable valve element in said first position and thereafter operate said actuator to move said valve element to an open position; filter means for removing finely divided suspended particulate material from said beverage prepared in said brewing chamber; said filter means comprising an enclosure having side walls, a lower wall and a removable cover at the upper end thereof, a sealing member between said cover and the upper edges of said side walls, and inner and outer compartments in said enclosure, said compartments being on opposite sides of a dividing member comprising a bottom wall, opposed end walls and vertically positioned opposed side walls formed from a flexbile foraminous filter material, sealing means between the upper edges of said side walls and end walls and said cover, members extending downwardly to said lower wall, said members thereby spacing the bottom wall of said dividing member from said lower wall; an inlet duct communicating between said outer compartment and said discharge port; and an outlet duct in said cover communicating with said inner compartment.

6. The apparatus of claim 5 wherein a resilient member is connected between said opposed side walls to yieldably bias said opposed side walls outwardly.

7. A beverage brewing and dispensing apparatus comprising in combination; a beverage brewing chamber, said chamber having a discharge port at the lower end thereof; a movable valve element in said discharge port; a beverage solids storage container; a solids dispenser operatively associated with said container to discharge a measured amount of said solids from said container into said brewing chamber; a water heater; duct means comunicating between said water heater and a source of water; a measuring valve communicating between said heater and said brewing chamber to dispense a measured amount of water from said heater into said chamber; a valve actuator means connected to said movable valve element, said movable valve element being normally in a first position adapted to seal said discharge port; control means to simultaneously operate said measuring valve and said solids dispenser with said movable valve element in said first position and thereafter operate said actuator to move said valve element to an open position; an inclined strainer, said strainer being positioned with the uppelr end thereof below said discharge port; receiver means below said strainer to intercept liquids passing therethrough; a receptacle positioned below the lower end of said strainer to receive solids passing off said lower end; filter means for removing finely divided suspended particulate material from said beverage prepared in said brewing chamber; said filter means comprising an enclosure having side walls, a lower wall and a removable cover at the upper end thereof, a sealing member between said cover and the upper edges of said side walls, an outer compartment therein, an inner and an outer compartment in said enclosure; said inner compartment comprising a bottom wall, opposed end walls and vertically positioned opposed side walls formed from a flexible foraminous filter material, sealing means between the upper edges of said side walls and end walls and said cover, members extending downwardly from said inner compartment to said lower wall, said members thereby spacing the bottom wall of said inner compartment from said lower wall, an inlet duct communicating between the outer compartment and said receiver means and an outlet duct in said cover communicating with said inner compartment.

8. The apparatus according to claim 7 wherein said filter enclosure is mounted within a further chamber having a thermostatically controlled electrical resistance heater provided therein to supply heat to the filter enclosure and thereby maintain liquid within said filter enclosure at a constant temperature suitable for drinking.

9. A beverage brewing and dispensing mechanism comprising in combination; means for mixing together a measured quantity of particulate beverage solids wtih a measured volume of heated water; means for storing the solids and water thus mixed together; an inclined strainer means, means for releasing the mixture of solids and liquid from said storage means after a predetermined time onto the upper surface of said strainer; means below the strainer for receiving liquids which have passed therethrough; means below the lower end of said strainer for receiving solids falling from the lower end thereof; a container, duct means communicating between said means for receiving liquids and said container; an outlet vent communicating with said container and a filter means in said container between said outlet vent and said duct means.

10. The apparatus according to claim 9 wherein heating means is operatively associated with said container for maintaining said container and its contents at a relatively constant temperature suitable for drinking.

11. The apparatus of claim 9 wherein said filter comprises a vertically disposed sheet of a flexible foraminous material.

12. In a beverage brewing apparatus with means for mixing together a measured quantity of beverage solids with a measured quantity of liquid, the improvement comprising, an inclined strainer having an upper end and a lower end and including a pair of downwardly depending horizontally disposed laterally spaced apart lip portions disposed longitudinally of said strainer, said strainer being positioned to receive on its upper surface a mixture of said solids and said liquid, said beverage solids being adapted to accumulate on the upper surface of said strainer and thereafter flow downwardly and fall off the lower end thereof, a receiver beneath said strainer to intercept liquid which has passed therethrough, duct means communicating with the receiver to deliver said liquid to a drinking receptacle, and means, including an upwardly extending member positioned between said lip portions, to receive said beverage solids passing off the lower end of said strainer whereby the lip portions and said upwardly extending member tend to prevent mixing of the beverage solids accumulated on the upper surface of said strainer with liquid which has passed through said strainer into said receiver.

13. A beverage brewing apparatus comprising a beverage solids storage container including side and bottom walls, said container having an outlet therein, a dispenser operatively associated with said storage container for transferring a predetermined quantity of said solids therefrom through said outlet, a brewing chamber positioned to receive material from said outlet, said brewing chamber having an outlet port, means for dispensing a measured quantity of liquid into said brewing chamber, a strainer positioned to receive material passing out of said brewing chamber through said outlet port and separate said solids from said liquid, a receiver below said strainer to intercept the liquid passing through said strainer, a storage receptacle communicating with said receiver, said storage receptacle including a chamber having side walls and a bottom wall, first and second compartments in said chamber, a verticaly disposed foraminous filter element between the compartments, said filter element being spaced from said bottom wall whereby the particulate material filtered from the beverage will fall from said filter element and accumulate in the bottom of said first chamber to avoid obstruction of said filter element and having an inlet opening in fluid communication with one of said compartments and an outlet opening in proximity to the upper end thereof and in fluid communication with the other of said compartments, a dispensing duct communicating with said outlet opening to convey said beverage to a drinking vessel, and during operation said receptacle being filled with said beverage whereby the addition of liquid through the inlet opening will cause a portion of the beverage within said receptacle to be discharged through the outlet opening.

References Cited in the file of this patent

UNITED STATES PATENTS

| | | |
|---|---|---|
| 48,559 | Kaufman | July 4, 1865 |
| 1,543,340 | Newberry | June 23, 1925 |
| 1,551,855 | Svendsgaard | Sept. 1, 1925 |
| 2,392,452 | Baumann | Jan. 8, 1946 |
| 2,460,084 | Hebo | Jan. 25, 1949 |
| 2,799,398 | Heymann | July 16, 1957 |
| 2,898,843 | Rockriver | Aug. 11, 1959 |

FOREIGN PATENTS

| | | |
|---|---|---|
| 1,084,691 | France | July 13, 1954 |